(12) United States Patent  
Arndt et al.

(10) Patent No.: US 11,318,819 B2  
(45) Date of Patent: May 3, 2022

(54) VEHICLE WINDOW UNIT

(71) Applicant: SAINT-GOBAIN GLASS FRANCE, Courbevoie (FR)

(72) Inventors: Martin Arndt, Aachen (DE); Heinrich Kronhardt, Kreuzau (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 45 days.

(21) Appl. No.: 16/979,392

(22) PCT Filed: Apr. 29, 2019

(86) PCT No.: PCT/EP2019/060842  
§ 371 (c)(1),  
(2) Date: Sep. 9, 2020

(87) PCT Pub. No.: WO2020/020498  
PCT Pub. Date: Jan. 30, 2020

(65) Prior Publication Data  
US 2021/0001696 A1     Jan. 7, 2021

(30) Foreign Application Priority Data

Jul. 26, 2018   (EP) ...................................... 8185740

(51) Int. Cl.  
*B60J 3/00* (2006.01)  
*B32B 7/023* (2019.01)  
(Continued)

(52) U.S. Cl.  
CPC ................ *B60J 3/007* (2013.01); *B32B 3/26* (2013.01); *B32B 7/023* (2019.01);  
(Continued)

(58) Field of Classification Search  
CPC .... B60J 3/007; B32B 7/023; B32B 17/10357; B32B 17/1066  
(Continued)

(56) References Cited

U.S. PATENT DOCUMENTS 3,208,070 A * 9/1965 Boicey ................. H01Q 1/1271  
343/712  
3,293,343 A * 12/1966 Mattimoe .................. B60J 1/02  
264/291  
(Continued)

FOREIGN PATENT DOCUMENTS

EP       0091776 A2 * 10/1983 ............. B60J 3/007  
EP     1 575 120 A1     9/2005  
GB       993 943 A       6/1965

OTHER PUBLICATIONS

International Search Report as issued in International Patent Application No. PCT/EP2019/060842, dated Jul. 19, 2019.  
(Continued)

*Primary Examiner* — Dennis H Pedder  
(74) *Attorney, Agent, or Firm* — Pillsbury Winthrop Shaw Pittman LLP

(57) ABSTRACT

A vehicle window unit that includes side curved regions that are arranged, in the installed state, near a, in particular standing, pillar of the vehicle body, wherein the curved regions are at least partially coloured in a transmittance reducing manner. The degree of colouration correlates with the degree of curvature.

19 Claims, 2 Drawing Sheets

(51) Int. Cl.
  *B32B 3/26* (2006.01)
  *B32B 17/10* (2006.01)
  *B60J 1/00* (2006.01)
  *B60J 1/02* (2006.01)
  *B60J 1/18* (2006.01)
  *B62D 25/04* (2006.01)

(52) U.S. Cl.
  CPC .... *B32B 17/10036* (2013.01); *B32B 17/1066* (2013.01); *B32B 17/10357* (2013.01); *B60J 1/008* (2013.01); *B60J 1/02* (2013.01); *B60J 1/18* (2013.01); *B62D 25/04* (2013.01); *B32B 2307/402* (2013.01); *B32B 2605/00* (2013.01)

(58) Field of Classification Search
  USPC .............................................. 296/84.1, 96.19
  See application file for complete search history.

(56) References Cited

U.S. PATENT DOCUMENTS

| | | | | |
|---|---|---|---|---|
| 3,512,880 | A | * | 5/1970 | Meyer-Arendt ....... G02C 7/105 351/45 |
| 4,138,284 | A | * | 2/1979 | Postupack ............... B05B 12/18 156/100 |
| 4,302,263 | A | * | 11/1981 | Postupack ......... B32B 17/10036 156/100 |
| 4,528,232 | A | * | 7/1985 | Cliffe ...................... B60J 3/007 428/195.1 |
| 4,555,434 | A | * | 11/1985 | Kunert ............. B32B 17/10761 428/194 |
| 5,040,838 | A | * | 8/1991 | Yoshizawa ................. B60J 1/02 296/84.1 |
| 5,130,174 | A | * | 7/1992 | Esposito ........... B32B 17/10339 428/156 |
| 5,500,274 | A | * | 3/1996 | Francis .................. B32B 17/08 428/156 |
| 6,866,918 | B2 | | 3/2005 | Sauer |
| 8,075,983 | B2 | * | 12/2011 | Masaki ............. B32B 17/10568 |

OTHER PUBLICATIONS

"Double vision (ghosting) at night through windshield," p. 16, Tesla Motors Club, Jun. 2016, Retrieved from the Internet: URL:https://teslamotorsclub.com/tmc/threads/double-vision-ghosting-at-night-throughwindshield.60997/page-16#post-1601152, 9 pages.

* cited by examiner

VEHICLE WINDOW UNIT

CROSS-REFERENCE TO RELATED APPLICATIONS

This application is the U.S. National Stage of PCT/EP2019/060842, filed Apr. 29, 2019, which in turn claims priority to European patent application number 18185740.0 filed Jul. 26, 2018. The content of these applications are incorporated herein by reference in their entireties.

FIELD

The invention relates to a vehicle window unit, and in particular a windshield or rear window of a passenger car or also a glass roof unit of a passenger car. The application of the invention is, however, not limited to the automotive industry, but, instead, it can also be used in watercraft and aircraft, in particular in small aircraft.

BACKGROUND

Vehicle window units of this type have long been known and have been used for decades in series production of passenger cars, but also of buses and other vehicles. It is also known to provide, at the upper edge of windshield units for passenger cars (and sometimes also in other vehicles) a partially transparent colouration or tinting that reduces the transmittance of the windows in this region in order to reduce the blinding of the driver and the front seat passenger by direct sunlight.

In the course of the development of passenger car design toward "more rounded", more organic, shapes, there has, for years, been a trend toward vehicle window units whose side curved regions have a very low radius of curvature and/or pronounced gradients of the radius of curvature. This trend exists especially in windshield units, where a panorama-like visual impression can be created for vehicle occupants as a result of the extension of the windshield into the conventional roof or side region of the vehicle. However, nowadays, the trend has also reached the design of rear window units and glass roofs, relating here to the short side edges of the glass roof adjacent the crossbeams of the roof.

Especially in windshields, but also under certain conditions in rear windows and glass roofs, the undesirable effect of the formation of so-called "double images" can occur. It is due to the fact that light passing through the pane is partially reflected on the glass surfaces. In addition to the primary image that is caused by light passing directly through the pane, an additional, less intense, and slightly offset image can be created by repeated reflection on the inner and outer pane surface. The effect is particularly pronounced at night and can, for example, result in the fact that the headlights of an oncoming vehicle are perceived as double. The disturbing effect is particularly pronounced in regions of strong curvature of the pane or pronounced gradients of the radius of curvature. To be sure, double images—as inevitable with curved glass—are permissible within certain limits according to the relevant ECE standards (ECE R43); nevertheless, their general avoidance is desirable and represents a development goal.

Also occurring in this region, in addition to the double images, can be optical distortions that interfere with the perception of the driver (and also of the other passengers) since the surroundings of the vehicle are perceived in a distorted manner. Especially in the case of the driver, they even represent a safety risk because, due to the distorted perception, he risks reacting incorrectly in certain traffic situations or making driving mistakes.

SUMMARY

The object of the invention is, consequently, to provide a vehicle window unit that largely suppresses double images and optical distortions in the perception of the vehicle occupants, even with greatly curved side regions.

This objective is accomplished by a vehicle window unit with the features of claim 1. Expedient further developments of the inventive concept constitute the subject matter of the dependent claims.

The vehicle window unit according to the invention includes side curved regions that are arranged, in the installed state, near a, in particular standing, pillar of the vehicle body. According to the invention, these curved regions are, at least partially, coloured in a transmittance reducing manner.

In an aspect of the invention, there is provided a vehicle window unit that includes side curved regions that are arranged, in an installed state, near a pillar of the vehicle body, wherein the curved regions are at least partially coloured in a transmittance reducing manner, wherein the degree of colouration changes as a function of location, and wherein the degree of colouration correlates with the degree of curvature.

DETAILED DESCRIPTION

The colouration according to the invention is arranged and implemented such that double images are largely suppressed in the region of small radii of curvature and/or large gradients of the radius of curvature. The reduction in total transmittance affects, in particular, the weaker-intensity double image, which, consequently, is either no longer perceived or is perceived only with further reduced intensity. Such colouration also yields, for the driver or passengers, significant improvements in the perception of image content, which can be greatly distorted by the strong curvature or the large radii of curvature.

In the context of the invention, the word "coloured" does not mean colouring in the strict sense (i.e., for instance, green or blue), but, in general, a reduction in transmittance, i.e., for instance, by a gray colouring, and/or changing, transitioning colourations from no transmittance to 100% transmittance. The concrete coloured (or gray tone) design will, in practice, take into account safety aspects as well as design specifications or feel-good factors. The colouring can also be referred to as tinting.

The side curved regions in the context of the invention have, in one embodiment of the invention, a relatively strong curvature such that they are more sharply curved than the averaged curvature of the pane. The radii of curvature in the side curved regions are thus smaller than the averaged radius of curvature of the entire panes. The curved regions are, in particular, more sharply curved than the central through-vision region of the pane. In an advantageous embodiment of the invention, the radius of curvature in the coloured curved regions according to the invention is less than 300 mm, in particular less than 200 mm, or even more specifically less than 100 mm. Here, the undesirable effect of double images and distortions would be, without the colouration according to the invention, the most pronounced and potentially the most dangerous such that the invention here brings a particularly great safety and comfort benefit. In many cases, a significant advantage in this context can be obtained if only part of the curved region is substantially coloured, whereas another part is left highly transparent in order to optimise the field of vision (in particular for the driver).

The disturbing optical effects occur not only with high absolute values of curvature, but also with strong changes in curvature over a short distance, i.e., with strong gradients of curvature. In such regions as well, the invention produces its effect particularly advantageously. Consequently, in another embodiment of the invention, a gradient of radii of curvature of at least 10, preferably at least 15, particularly preferably at least 20 occurs in the side curved regions. The gradient is indicated unitlessly as a change in radius in [mm] divided by the distance on the pane in [mm].

Figure 1:
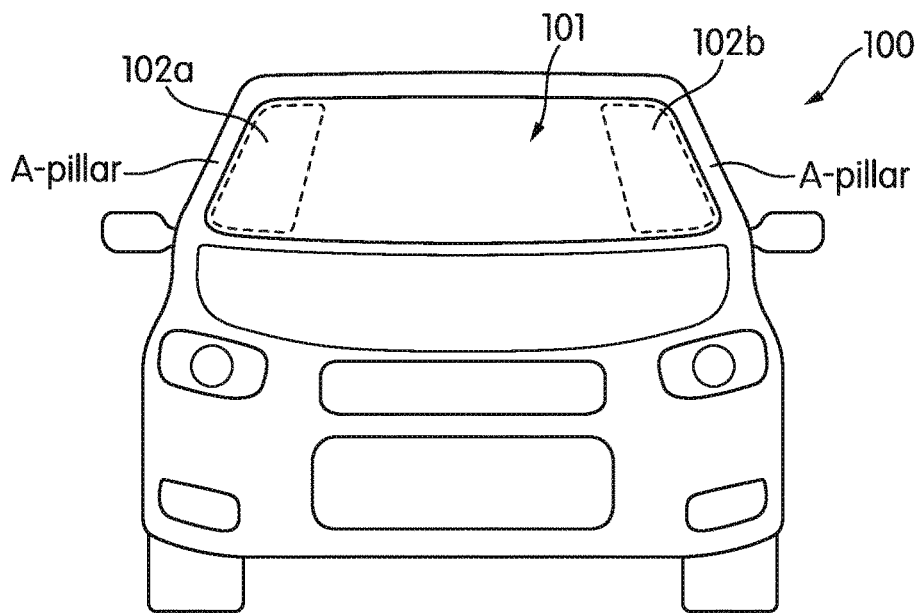
FIG. 1 schematically shows a front view of a vehicle that includes a vehicle window unit according to an embodiment of the invention.
Figure 2A:
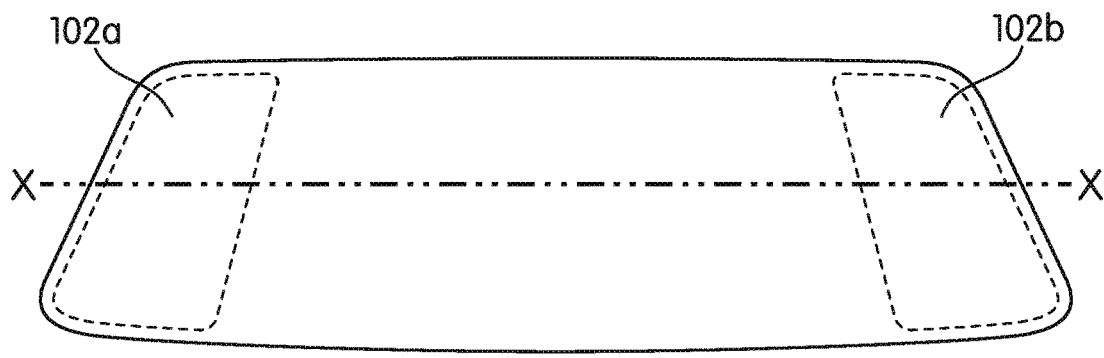
FIG. 2a schematically shows a front view of the vehicle window unit of FIG. 1.

FIG. 1 schematically shows a front view of a vehicle 100 that includes a vehicle window unit 101 according to an embodiment of the invention. The vehicle window unit 101 is a windshield installed near an A-pillar of the vehicle 100. FIG. 2a schematically shows a front view of the vehicle window unit 101 of FIG. 1. The vehicle window unit 101 includes curved regions 102a, 102b that are colored. In the curved regions 102a, 102b, the degree of colouration changes as a function of location such that the degree of colouration correlates with the degree of curvature. In particular, in the curved regions 102a, 102b, the window unit 101 is more tinted near the A-pillar where the degree of curvature of the window unit 101 is greater. In FIGS. 1 and 2a, the colouration of curved regions 102a, 102b is designed such that a reduced transmittance is between 50% and 75% of a transmittance of a rest of a window area of the window unit 101. Moreover, in the curved regions 102a, 102b, the colouration is less pronounced toward edges of each coloured region 102a, 102b such that the transmittance increases toward the edges.

As shown in FIGS. 1 and 2a, the side curved regions 102a, 102b occur near or at a pillar (A-pillar in FIGS. 1 and 2a) or strut of the vehicle body. In the context of the invention, this means that the curved regions are arranged in the vicinity of one or more side edges of the pane that, in the installed position, are turned toward the pillar or strut in question, and, in this context, are associated with the side edges in question. The colouration according to the invention can extend directly from the side edge in the direction of the center of the pane or even have a distance from the side edge that is covered in particular by the peripheral, opaque masking print customary for vehicle window panes.

In an embodiment particularly significant from a current perspective, the vehicle window unit is implemented as a front window unit (windshield) of a passenger means of transportation, wherein the coloured curved regions are those that are positioned, in the installed state, near an A-pillar. As shown in FIG. 2a, the colouration according to the invention is, consequently, preferably arranged outside the central field of vision A per Regulation No. 43 of the United Nations Economic Commission for Europe (UN/ECE) (ECE-R43, "Uniform Provisions concerning the Approval of Safety Glazing Materials and Their Installation on Vehicles").

In another embodiment, the vehicle window unit is implemented as a rear window unit of a passenger means of transportation, wherein the coloured curved regions are positioned, in the installed state, near a C-pillar.

In yet another embodiment, the vehicle window unit is implemented as a glass roof unit of a passenger means of transportation, wherein a coloured curved region is provided at least at or near a narrow side edge of the glass roof unit, which is positioned, in the installed state, at a border strut or an edge of a border frame of the roof.

Figure 3:
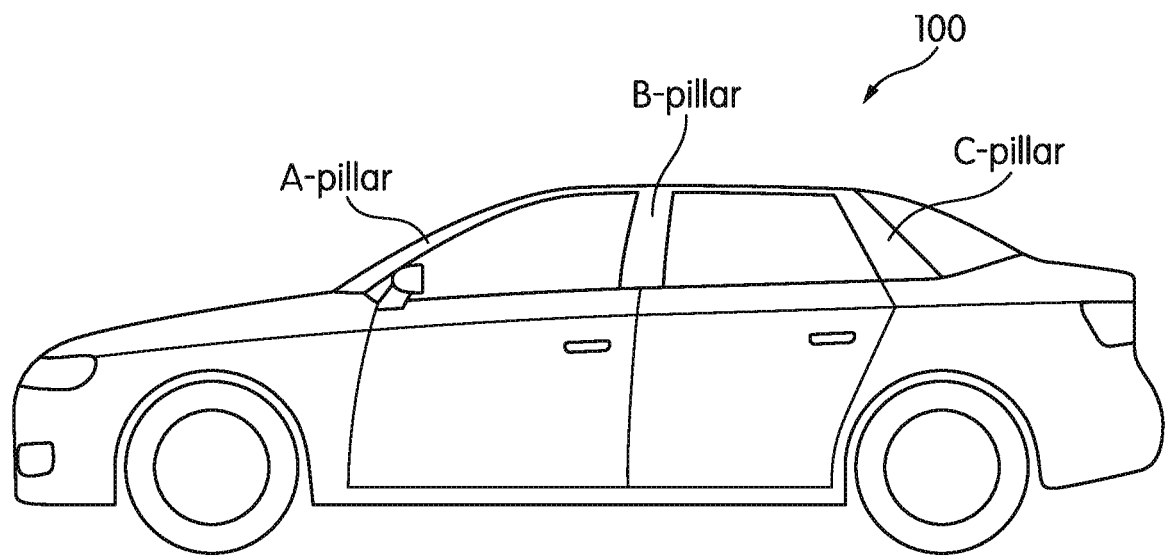
FIG. 3 schematically shows a side view of the vehicle of FIG. 1.
Figure 4:
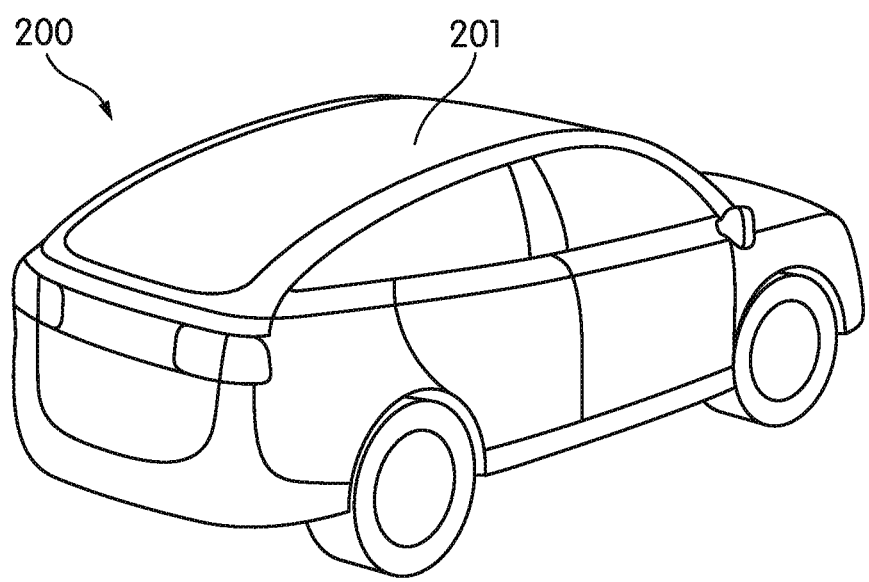
FIG. 4 schematically shows a glass roof unit or panoramic vehicle window of a vehicle.

In novel design solutions of the developing further embodiments, the vehicle window unit is implemented as a panoramic vehicle window of a passenger means of transportation (windshield to side window/windshield to roof pane/roof pane to rear window/rear window to side window), wherein a coloured curved region is provided at least at or near a narrow side edge of the roof pane. These are curved regions that are arranged, in the installed state, near a, in particular a standing, pillar of the vehicle body. In the case of implementation of the vehicle window unit as a front window unit of a passenger car, the curved regions are, in particular, the regions adjacent the A-pillar of the passenger car body; in implementation as a rear window unit, the regions adjacent the C-pillar; and in implementation as a glass roof unit, the front and/or rear edge region and/or side region of the glass roof. FIG. 3 shows a side view of the vehicle 100 that includes the A-pillar, the B-pillar and the C-pillar. FIG. 4 shows a vehicle 200 that includes a window unit 201 forming the roof or a panoramic window of the vehicle. Consequently, when the claimed definition of the invention refers to the "standing column" of the vehicle body, this does not, strictly speaking, apply to the implementation as a glass roof unit. When the claim refers to a "vehicle body", this means, in the most general sense, the outer shell of a land, water, or air vehicle, i.e., also a boat or aircraft shell.

The colouration of curved regions according to the invention is advantageously implemented such that the reduced transmittance is between 50% and 75%, in particular between 55% and 68%, of the transmittance of the rest of the window area. In this indication of a transmittance percentage, the basis is transmittance averaged over the visible light spectrum.

The colouration according to the invention can be homogeneous over the entire curved region. However, colour gradients or tint gradients can also be provided, wherein the degree of colouration changes as a function of location, for example, as a function of the distance from the associated side edge.

Here, it is particularly advantageous for the degree of colouration to correlate with the degree of curvature, wherein more strongly curved regions have stronger colouring and less strongly curved regions have less colouring. Thus, the total transmittance through the panes can be maximised since the regions of different curvature are coloured to the extent necessary to avoid optical disturbances. Since the most strongly curved regions are typically not directly at the side edge, but rather are arranged somewhat offset therefrom, provision is advantageously made for the colouration toward the edges of the/each coloured region to be less pronounced such that the transmittance increases toward the edges. Also, the transmittance can increase again starting from a region of maximum colouring in the direction of the center of the pane. With such a progression of colouration, both the aesthetic impression and the optical perception are improved for the vehicle occupants, since "hard" colour or gray tone edges are avoided.

Figure 2B:
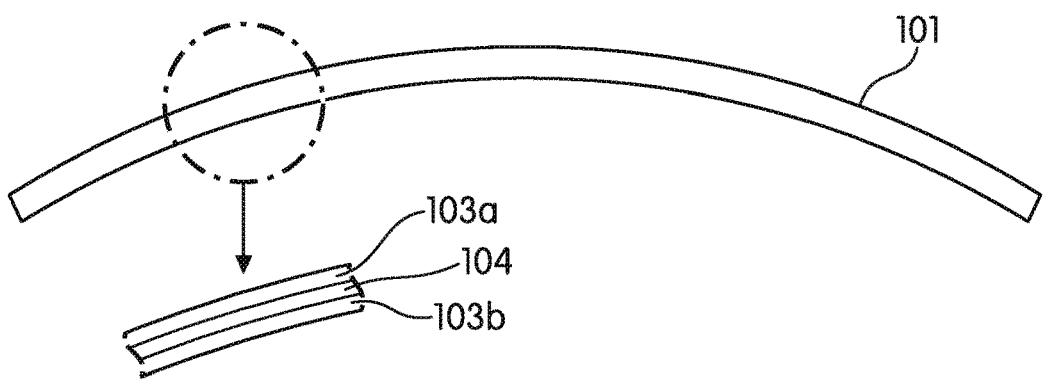
FIG. 2b schematically shows a cross-section view of the vehicle window unit of FIG. 1.

The window unit can be constructed from a single transparent pane, in particular a glass pane, or as a composite pane of at least two transparent panes, in particular glass panes, with an intermediate polymer film. FIG. 2b shows a cross-section view of the window unit 101. As shown in FIG. 2b, the window unit 101 is a composite pane that includes glass panes 103a, 103b with intermediate film 104. The polymeric film 104 can be coloured in the curved regions 102a, 102b. Alternatively, one of the glass panes 103a, 103b can be coloured in the curved regions 102a, 102b. In addition, a colored coating can be provided on one of the glass panes 103a, 103b in the curved regions 102a, 102b. As shown in FIG. 2b, the curvature in the side curved regions is more pronounced than an averaged curvature of the pane. The glass panes 103a, 103b or polymeric film 104 may be imprinted in the coloured curved regions 102a, 102b. On the one hand, for the technical implementation, provision can be made for the glass or a polymeric film inserted in a composite glass to be coloured in the coloured curved regions. Such coloured glasses or polymer films, even with a progressive characteristic are also readily achievable, even in series series production such that more precise explanations in that regard are unnecessary. Alternatively, provision can be made to imprint the glass or a polymer film inserted in a composite glass in the coloured curved regions. A film section provided specifically for colouring can even be additionally inserted in a composite glass.

The embodiment of the invention is not restricted to the aforementioned examples and aspects, but is also possible in a large number of variations that are made accessible to the person skilled in the art within the scope of the appended claims.

The invention claimed is:

1. A vehicle window unit that includes side curved regions that are arranged, in an installed state, near a pillar of the vehicle body,
   wherein the curved regions are at least partially coloured in a transmittance reducing manner,
   wherein the degree of colouration changes as a function of location, and wherein the degree of colouration correlates with the degree of curvature.

2. The vehicle window unit according to claim 1, wherein the curvature in the side curved regions is more pronounced than an averaged curvature of the pane.

3. The vehicle window unit according to claim 1, wherein a radius of curvature in the side curved regions is less than 300 mm.

4. The vehicle window unit according to claim 1, wherein in the side curved regions a gradient of radii of curvature of at least 10 occurs.

5. The vehicle window unit according to claim 1, implemented as a front window unit of a passenger means of transportation, wherein the coloured curved regions are those that are positioned, in the installed state, near an A-pillar of the vehicle body.

6. The vehicle window unit according to claim 1, implemented as a rear window unit of a passenger means of transportation, wherein the coloured curved regions are positioned, in the installed state, near a C-pillar of the vehicle body.

7. The vehicle window unit according to claim 1, implemented as a glass roof unit of a passenger means of transportation, wherein a coloured curved region is provided at least at or near a narrow side edge of the glass roof unit, which is positioned, in the installed state, at a border strut of a roof of the vehicle body.

8. The vehicle window unit according to claim 1, implemented as a panoramic vehicle window of a passenger means of transportation (windshield to side window/windshield to roof pane/roof pane to rear window/rear window to side window) wherein a coloured curved region is provided at least at or near a narrow side edge of the roof pane.

9. The vehicle window unit according to claim 1, wherein the colouration of curved regions is designed such that a reduced transmittance is between 50% and 75% of a transmittance of a rest of a window area.

10. The vehicle window unit according to claim 1, wherein a degree of colouration changes as a function of a distance from an associated side edge.

11. The vehicle window unit according to claim 10, wherein the colouration is less pronounced toward edges of each coloured region such that the transmittance increases toward the edges.

12. The vehicle window unit according to claim 1, wherein the glass itself, a coating on the glass, or a polymeric film inserted into a composite glass is coloured in the coloured curved regions.

13. The vehicle window unit according to claim 1, wherein the glass or a polymeric film inserted into a multilayer glass is imprinted in the coloured curved regions.

14. The vehicle window unit according to claim 1, wherein the pillar is a standing pillar.

15. The vehicle window unit according to claim 3, wherein the radius of curvature in the side curved regions is less than 200 mm.

16. The vehicle window unit according to claim 15, wherein the radius of curvature in the side curved regions is less than 100 mm.

17. The vehicle window unit according to claim 4, wherein in the side curved regions a gradient of radii of curvature of at least 15 occurs.

18. The vehicle window unit according to claim 17, wherein in the side curved regions a gradient of radii of curvature of at least 20 occurs.

19. The vehicle window unit according to claim 9, wherein the colouration of curved regions is designed such that the reduced transmittance is between 55% and 68% of the transmittance of the rest of the window area.

* * * * *

UNITED STATES PATENT AND TRADEMARK OFFICE
CERTIFICATE OF CORRECTION

| | | |
|---|---|---|
| PATENT NO. | : 11,318,819 B2 | Page 1 of 1 |
| APPLICATION NO. | : 16/979392 | |
| DATED | : May 3, 2022 | |
| INVENTOR(S) | : Martin Arndt et al. | |

It is certified that error appears in the above-identified patent and that said Letters Patent is hereby corrected as shown below:

On the Title Page

In Item (30) Foreign Application Priority Data, the priority application number should read:
Jul. 26, 2018 (EP).............................18185740

Signed and Sealed this
Twelfth Day of July, 2022

Katherine Kelly Vidal
*Director of the United States Patent and Trademark Office*